United States Patent
Ono et al.

(10) Patent No.: US 7,878,740 B2
(45) Date of Patent: Feb. 1, 2011

(54) DRILL GUIDE JIG

(75) Inventors: Masahiro Ono, Saitama (JP); Takahiro Kunichi, Saitama (JP); Hiroki Sato, Saitama (JP); Tsuyoshi Yadori, Saitama (JP); Akihiko Koshido, Saitama (JP); Tomoya Ohtani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/222,512

(22) Filed: Aug. 11, 2008

(65) Prior Publication Data

US 2009/0060668 A1    Mar. 5, 2009

(30) Foreign Application Priority Data

Aug. 27, 2007    (JP) .............................. 2007-219306

(51) Int. Cl.
    *B23B 47/28*    (2006.01)
(52) U.S. Cl. ................................ 408/115 R; 408/115 B
(58) Field of Classification Search .............. 408/72 R, 408/72 B, 115 R, 115 B, 241 B; *B23B 47/28, B23B 49/02*
    See application file for complete search history.

(56) References Cited

U.S. PATENT DOCUMENTS

| | | | | |
|---|---|---|---|---|
| 2,008,436 | A | * | 7/1935 | Cross ........................... 408/110 |
| 2,635,348 | A | * | 4/1953 | Jones ........................... 33/638 |
| 2,936,657 | A | * | 5/1960 | Berlin et al. ................... 408/79 |
| 3,199,380 | A | * | 8/1965 | Threlkeld ..................... 408/72 R |
| 3,661,469 | A | * | 5/1972 | Leff et al. ..................... 408/72 R |
| 7,153,070 | B1 | * | 12/2006 | Schroeder ................ 408/115 R |

FOREIGN PATENT DOCUMENTS

| | | | |
|---|---|---|---|
| AU | 677943 B | * | 5/1997 |
| AU | 9913215 A | * | 7/2000 |
| AU | 2002100098 A4 | * | 5/2002 |
| EP | 894560 A1 | * | 2/1999 |
| EP | 1447163 A1 | * | 8/2004 |
| JP | 09038828 A | * | 2/1997 |
| JP | 10175107 A | * | 6/1998 |
| JP | 2001259912 A | * | 9/2001 |
| JP | 2003-39217 A | | 2/2003 |
| JP | 2004042243 A | * | 2/2004 |
| WO | WO 0074884 A1 | * | 12/2000 |

* cited by examiner

*Primary Examiner*—Daniel W Howell
(74) *Attorney, Agent, or Firm*—Birch Stewart Kolasch & Birch, LLP

(57) ABSTRACT

A drill guide jig for guiding a drill orthogonally to a curved surface of a workpiece is disclosed. The jig is provided with a guide member having a guide hole for passing a drill and a holding member for holding the guide member. The holding member has a contact part for making contact with a curved surface of the workpiece on the lower side. The contact part has two contact points for making contact with the curved surface. The two contact points are symmetrical in relation to a center axis orthogonal to a midpoint of a line segment that connects the contact points. The drill is perpendicular in relation to the curved surface of the workpiece because the guide hole is disposed along the center axis.

8 Claims, 11 Drawing Sheets

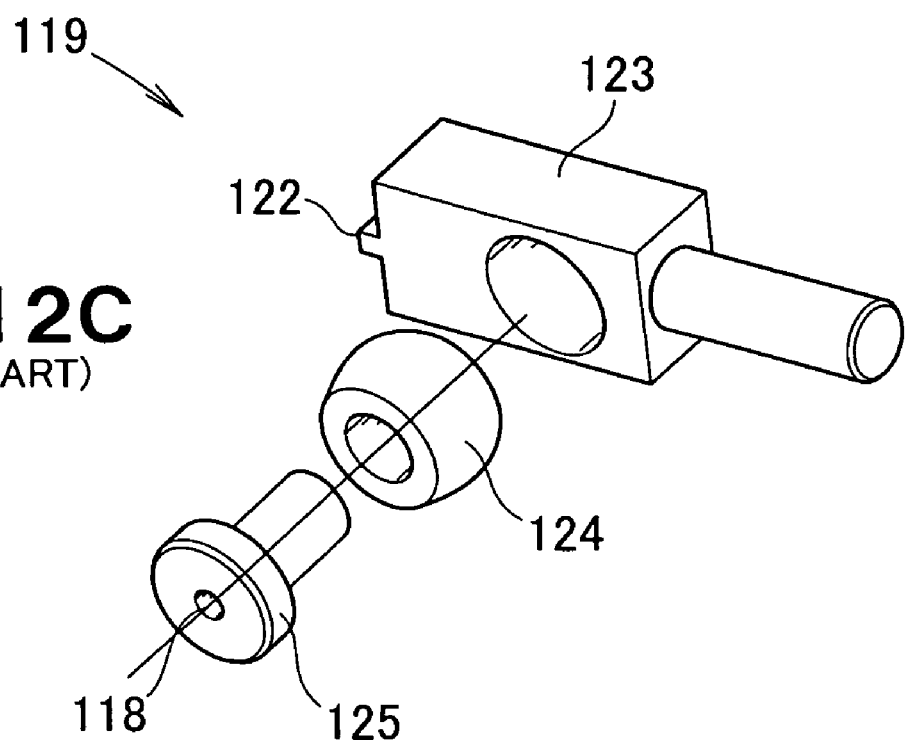

DRILL GUIDE JIG

FIELD OF THE INVENTION

The present invention relates to a drill guide jig for guiding a drill of a hand drill apparatus.

BACKGROUND OF THE INVENTION

An aircraft fuselage is configured by having panels affixed to a frame. The panels are curved panels that follow the shape of the aircraft. The curved panels are secured to the frame using rivets. A relationship between the curved panels and the rivets is described in FIGS. 11A and 11B hereof.

A rivet hole 102 is formed in a curved panel 101, and a rivet 103 is driven into the rivet hole 102, as shown in FIG. 11A. An external peripheral end portion 104 (triangular portion shown by an imaginary line) of the head of the rivet 103 inevitably protrudes to the outside. In view of the above, the end portions 104, 105 are eliminated by shaving. As a result, the head of the rivet 103 becomes rounded, and air resistance can be reduced.

The distal end of a drill may slide and become misaligned when the drill is placed on the curved surface, and the rivet hole 102 may be formed diagonally. When this occurs, an axis 106 of the rivet 103 tilts at angle θ in relation to a normal 107 to the curved surface 101, as shown in FIG. 11B. As a result, the external peripheral end portion 104 protrudes considerably, the amount of cutting increases, and shaving costs increase. Also, the fastening performance of the rivet 103 is affected. In the case of FIG. 11A, there is no problem because the angle θ is zero or sufficiently small. Accordingly, there is a need for a technique that can reduce the angle θ.

In this manner, a drill guide jig is known that can reduce the tilting angle θ of the rivet 103, as disclosed in Japanese Patent Application Laid-Open Publication No. 2003-39217, for example. The fixed jig disclosed in the 2003-39217 publication is shown in FIGS. 12A to 12C hereof.

A fixed jig 110 used for securing a workpiece is composed of support stands 111, 111, support columns 112, 112 supported by the support stands 111, 111, a workbench 113 supported by the support columns 112, 112, and a plurality of jig parts 114 disposed on the workbench 113, as shown in FIG. 12A.

A fixed part 116 manufactured so as to conform to the shape of a first workpiece 115 on the lower surface of the workpiece 115, a second workpiece 117 fastened by a rivet to the first workpiece 115, and a main jig unit 119 having a guide hole 118 for holding a drill are disposed in the jig parts 114, as shown in FIG. 12B, which is an enlarged view of b of FIG. 12A. The main jig body 119 is supported by a plurality of support grooves 121 formed on the fixed part 116.

The main jig body 119 is composed of a base 123 having a protruding part 122 that fits into a support groove 121 (FIG. 12B) at the end part, a spherical bearing 124 inserted into the base 123, and a guide bush 125 inserted into the spherical bearing 124 and which guides the drill, as shown in FIG. 12C, which is an enlarged view of c of FIG. 12B.

The guide bush 125 slides due to the action of the spherical bearing 124, and a guide hole 118 is positioned in relation to the first workpiece 115 when the distal end of the guide bush 125 is brought into contact with the first workpiece 115 (FIG. 12B).

With the fixed jig 110, a rivet hole can be formed at a prescribed angle by inserting the drill through the guide hole 118. It is beneficial that a rivet hole can be formed at a prescribed angle, regardless of the ability of a worker.

However, the fixed jig 110 must be provided with jig parts 114 in accordance with the number of rivet holes. The fixed part 116, which is an essential part in the jig parts 114, is very expensive due to being manufactured each time in accordance with the shape of the first workpiece 115. Additionally, the spherical bearing 124, which a part essential to the jig parts 114, has a complex mechanism and is very expensive. When the number of rivet holes to be formed increases, the number of jig parts 114 also increases and manufacturing costs increase as well.

SUMMARY OF THE INVENTION

It is therefore an object of the present invention to provide an inexpensive drill guide jig having a small number of components.

According to an aspect of the present invention, there is provided a drill guide jig for guiding a drill orthogonally to a curved surface of a workpiece when a hole is formed in the curved surface using a hand drill apparatus is provided, the jig comprising a guide member having a guide hole for guiding the drill, and a holding member for holding the guide member, the holding member being able to be grasped by a worker and having a contact part for contacting the curved surface, wherein the contact part has two left and right contact points for contacting the curved surface, and the guide hole is disposed along a center axis orthogonal to a midpoint of a line segment that connects the two contact points.

The two contact points are disposed so as to be symmetric in relation to the center axis and are in contact with the curved surface of the workpiece. The guide hole is disposed along the center axis. A rivet hole may be formed perpendicularly to the workpiece having the curved surface when the drill guide jig is placed on the curved surface of the workpiece and the drill is passed through the guide hole.

The drill guide jig can be manufactured using few parts. Additionally, the drill guide jig can be manufactured without using complex, expensive parts. In other words, [the drill guide jig] may be inexpensively manufactured using a small number of inexpensive parts.

The curved surface is a compound curved surface composed of a plurality of radii, and the contact part is provided with a plurality of right contact points and a plurality of left contact points that correspond to the plurality of radii of curvature. Accordingly, the left and right contact points corresponding to the plurality of radii make contact with the workpiece, and a rivet hole can be formed perpendicularly to the workpiece. A single drill guide jig can conform to a workpiece having a compound curved surface composed of a plurality of radii.

The contact part includes a curved surface established by sequentially connecting the plurality of contact points. Accordingly, a point on the curved surface comes into contact with the workpiece. In other words, the jig can easily be set on the workpiece.

The compound curved surface is composed of a plurality of contiguous curved surfaces having radii that increase in steps; a left contact point having the shortest distance from the center axis is designated as a first left contact point; a right contact point which corresponds to the first left contact point is designated as a first right contact point; and the length of a line segment connecting the first left contact point and the first right contact point is limited so that, when a center axis orthogonal to the midpoint of the line segment connecting the first left contact point and the first right contact point is offset from a desired normal due to the difference in radii between a curved surface in contact with the first left contact point and a curved surface in contact with the first right contact point, the angle θ formed by the normal and the center axis converges to within a preset range.

The length of the line segment is thus limited so that the offset of the center axis and the normal converges to within a preset range. The offset of the center axis and the normal is caused by the effect of adjoining curved surfaces having different radii. The drill portion passes through the center axis and forms a rivet hole in the workpiece. A rivet hole can be formed in the curved panel of the workpiece in a range of substantially 90°.

The curved surface presents a V-shape that includes the first left contact point and the first right contact point. Accordingly, the jig can more easily be set on the workpiece.

The contact part has an elastically deformable anti-slip member having a high coefficient of friction. When the jig makes contact with the curved surface of the workpiece, the concern that the jig will slip on the workpiece is eliminated by to the anti-slip effect of the anti-slip member. As a result, the hole-opening work by the hand drill apparatus can be smoothly performed.

The anti-slip member is held in a placement groove so that a portion of the anti-slip member protrudes from the placement groove formed on the periphery of the contact part.

The contact part has a notched groove in a portion thereof.

BRIEF DESCRIPTION OF THE DRAWINGS

Certain preferred embodiments of the present invention will be described in detail below, by way of example only, with reference to the accompanying drawings, in which:

FIGS. 12A to 12C are perspective views showing a conventional fixed jig, wherein FIG. 12B shows part b of FIG. 12A, and FIG. 12C shows part c of FIG. 12B.

DETAILED DESCRIPTION OF THE PREFERRED EMBODIMENTS

Figure 1:
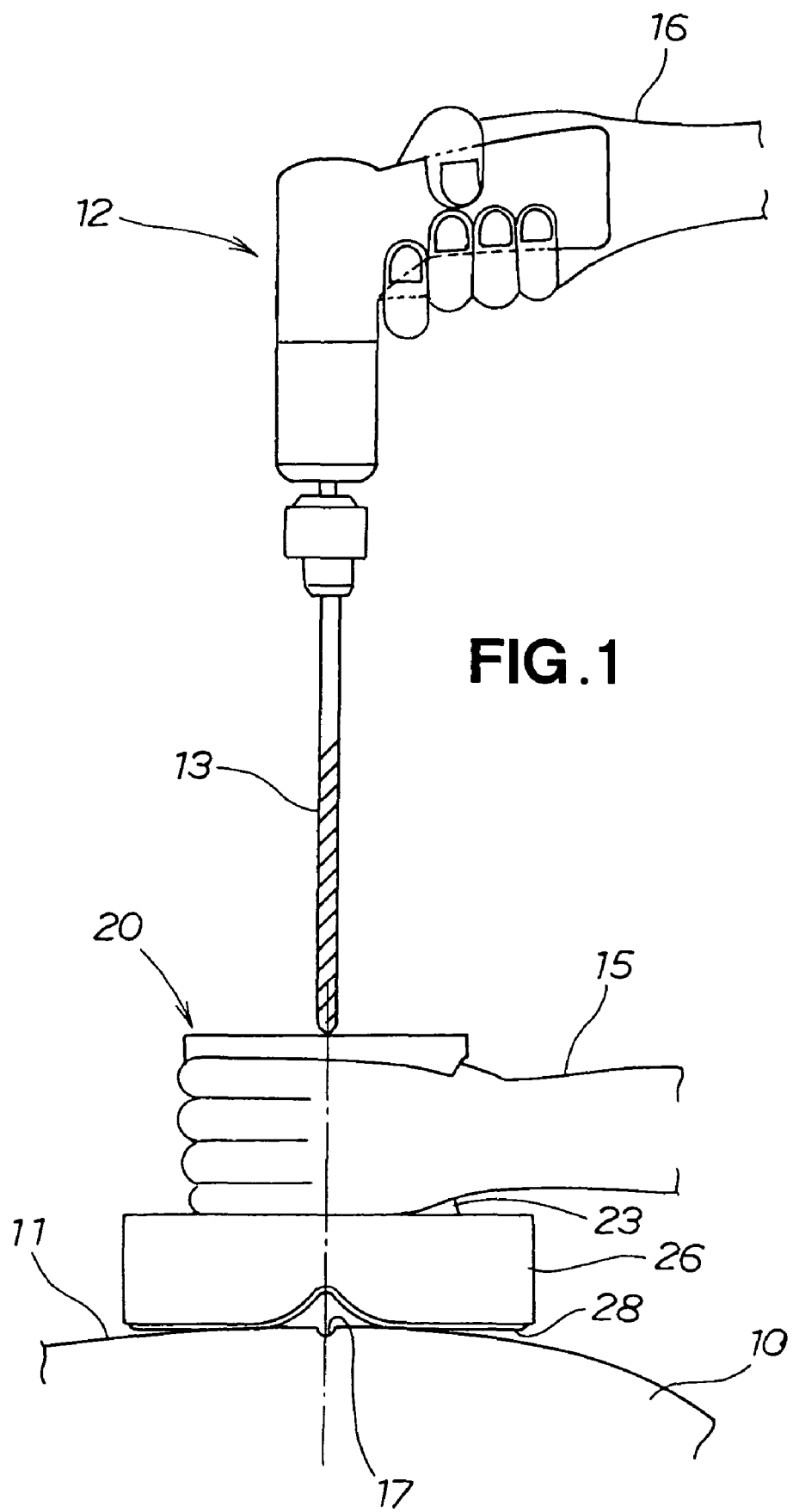
FIG. 1 is a view illustrating a method for using a drill guide jig according to the present invention.

Referring now to FIG. 1, a drill guide jig 20 is a jig for guiding a drill 13 orthogonally to a curved surface 11 when a hole is formed in the curved surface 11 of a workpiece 10 using a hand drill apparatus 12. For example, a worker brings the drill guide jig 20 into contact with the workpiece 10 while holding the jig with the left hand 15, and operates the hand drill apparatus 12 using the right hand 16. A punch mark 17 is punched into the workpiece 10 in advance. The worker forms the hole while bringing the distal end (lower end in the drawing) of the drill 13 into contact with the punch mark 17.

Following is a description of the structure of the drill guide jig 20.

Figure 2:
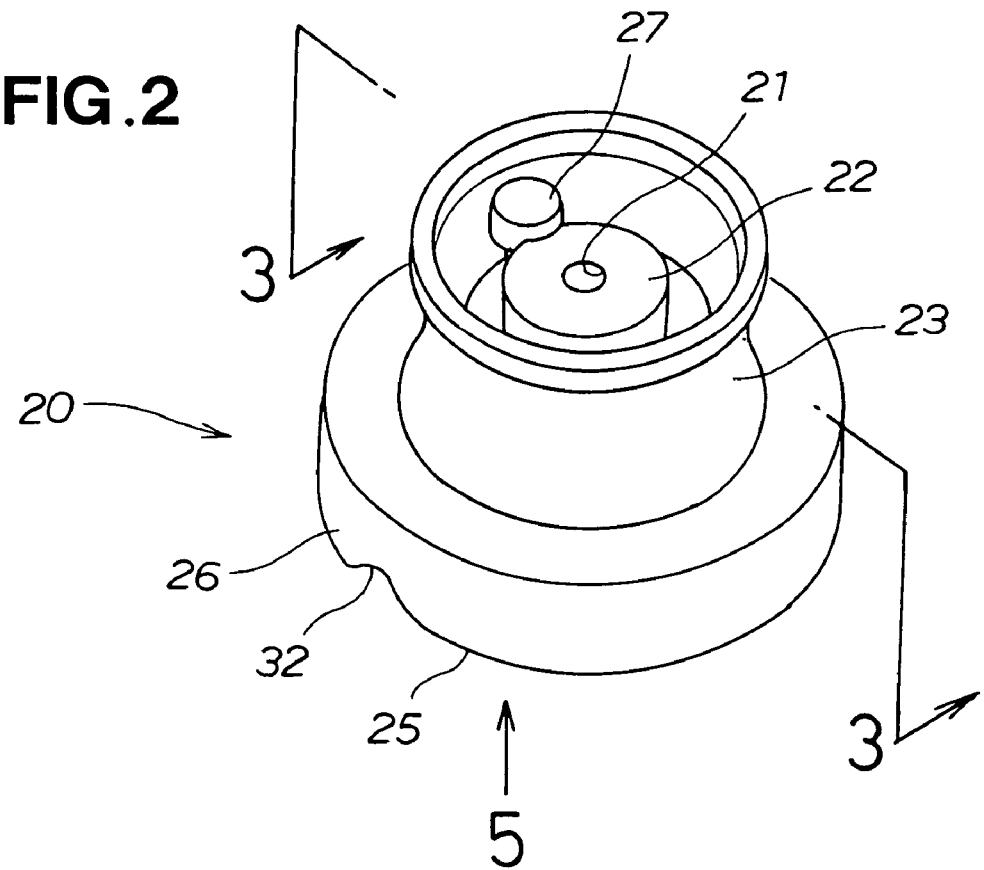
FIG. 2 is a perspective view of the drill guide jig shown in FIG. 1.
Figure 3:
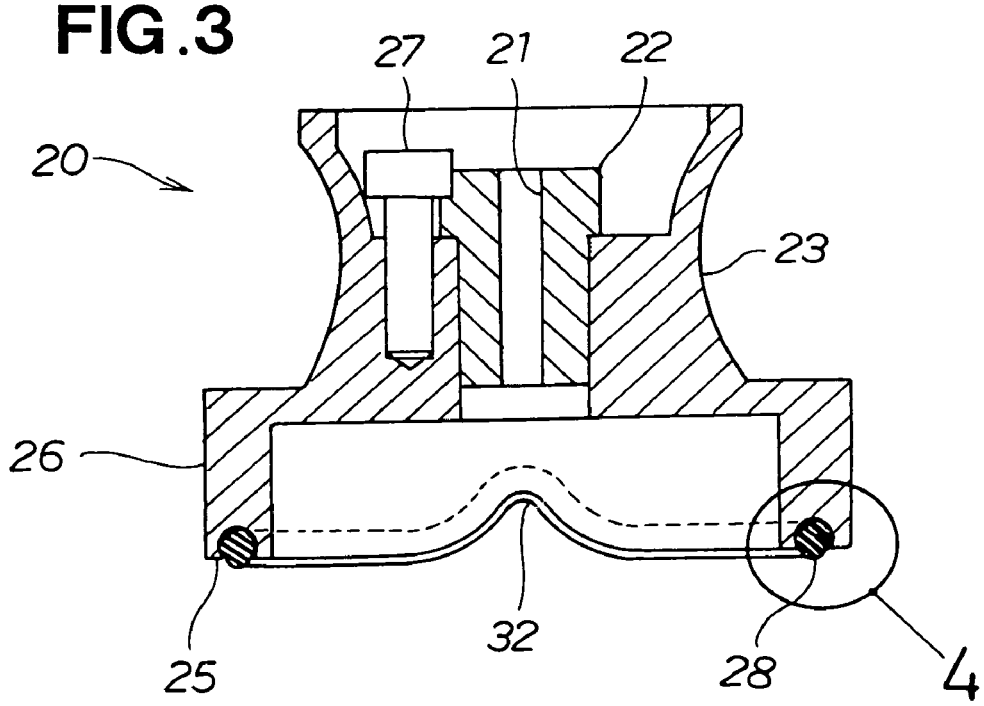
FIG. 3 is a cross-sectional view taken along line 3-3 of FIG. 2.

The drill guide jig 20 is composed of a guide member 22 having a guide hole 21 for guiding the drill, and a holding member 26 for holding the guide member 22, as shown in FIGS. 2 and 3. The holding member 26 has a grip part 23 on a side surface thereof for grasping by a worker, and a contact part 25 at a lower part thereof for making contact with the workpiece 10 (FIG. 1). The shape of the contact part 25 is described below.

The guide member 22 is inserted into the holding member 26 from above, and the guide member 22 is thereafter rotated through a prescribed angle and held by the holding member 26 using a retaining pin 27.

An anti-slip member 28 is affixed on the lower part of the holding member 26.

Figure 4:
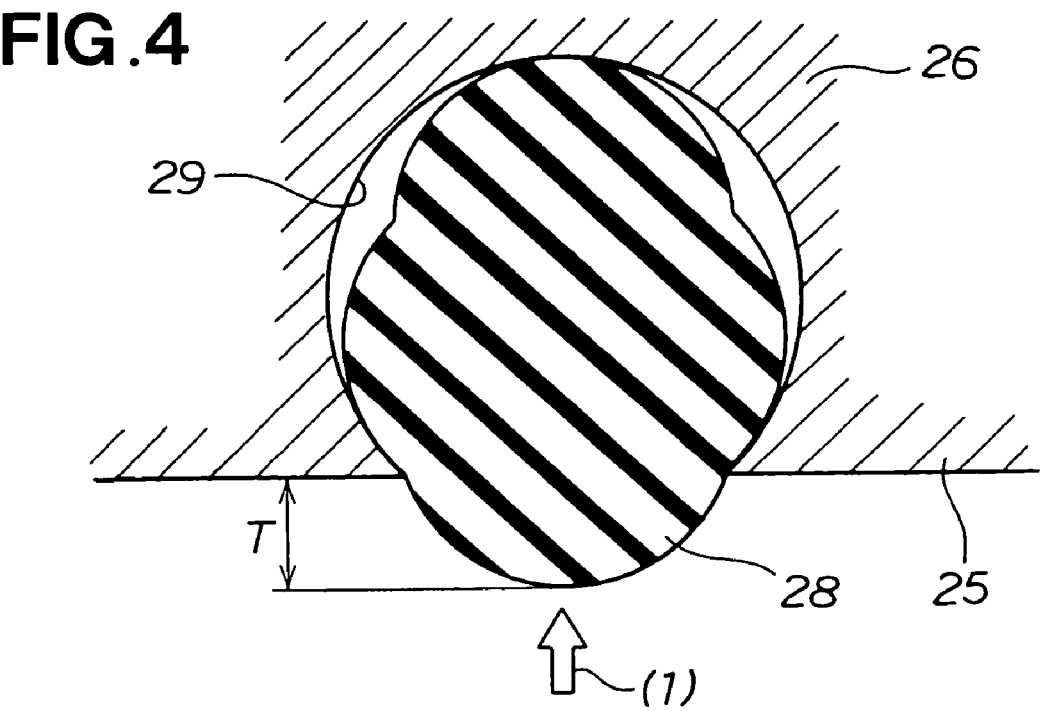
FIG. 4 is an enlarged view of part 4 of FIG. 3.

An anti-slip member placement groove 29 is disposed on the contact part 25 of the lower part of the holding member 26, as shown in FIG. 4. The anti-slip member placement groove 29 holds the anti-slip member 28. The material for the anti-slip member 28 is preferably a rubber material, soft resin, or another material having good elastic deformation performance.

The anti-slip member 28 protrudes over a distance T from the anti-slip member placement groove 29 to the exterior. The anti-slip member 28 is compressed and held in the anti-slip member placement groove 29 when a force indicated by the arrow (1) acts on the anti-slip member 28. The anti-slip member 28 slightly expands in the depth direction of the diagram as a result of being compressed. The concern that the holding member 26 will slip on the workpiece is eliminated by the effect of the anti-slip member 28.

Figure 5:
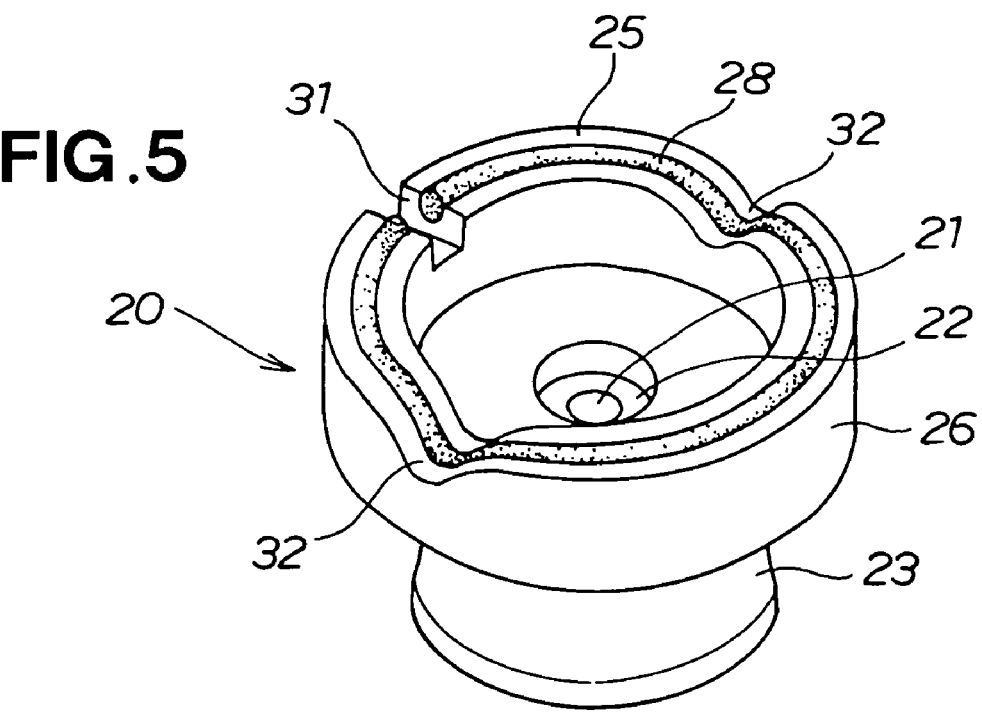
FIG. 5 is a perspective view showing the drill guide as viewed in the direction arrow 5 of FIG. 2.

A partially notched groove 31 is formed in the contact part 25, as shown in FIG. 5. The anti-slip member 28 is also notched away by an amount equal to the notched groove 31. The anti-slip member 28 fills the available space and the axial length increases in the lengthwise direction when the external force indicated by the arrow (1) acts in FIG. 4. The variation in axial length is absorbed by allowing the discontinuous end part of the anti-slip member to enter and exit the notched groove 31.

The contact part 25 also has V-shaped parts 32, 32 in opposing positions. The V-shaped parts 32 will be described in detail below.

Figure 6:
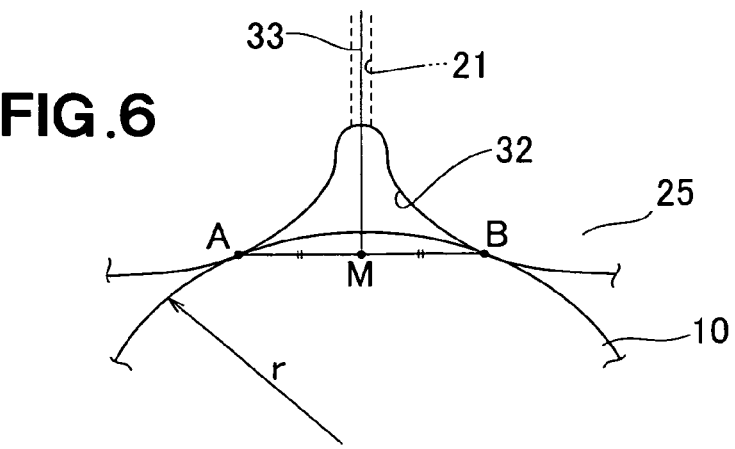
FIG. 6 is a schematic view showing a state of contact between a workpiece and a contact part shown in FIG. 5.

The contact part 25 is brought into contact with the workpiece 10 having a radius r, as shown in FIG. 6. At this point, the contact part 25 makes contact with the workpiece 10 at the two contact points A and B. A midpoint M of a line segment that connects the left and right contact points A, B is set. A center axis 33 orthogonal to the midpoint M is made to match the center axis of the guide hole 21.

In other words, the contact part 25 has two left and right contact points A, B for contacting the curved surface of the workpiece 10, and the guide hole 21 is set along the center axis 33, which is orthogonal to the midpoint M of the line segment connecting the two contact points A, B.

When a drill passes through the guide hole 21, the drill moves forward along the center axis 33, and a hole can be accurately formed in the workpiece 10.

Figure 7A:
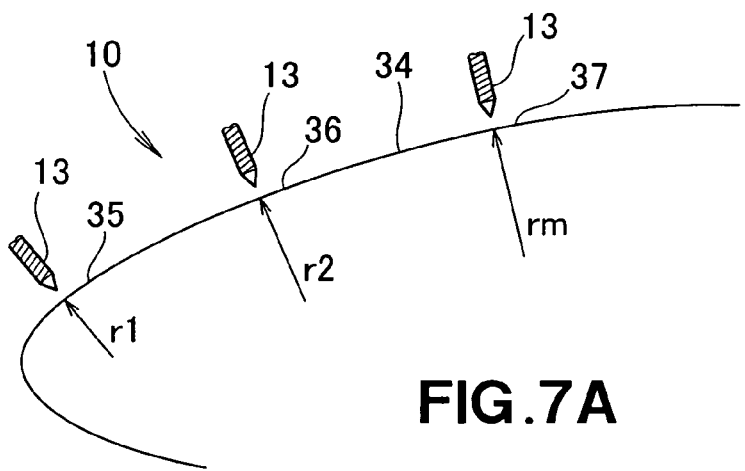
FIGS. 7A and 7B are schematic views of a workpiece configured with a compound curved surface.

An airplane fuselage is provided with a compound curved surface. The workpiece 10 has a compound curved surface 34, as shown in FIG. 7A. The compound curved surface 34 is a smooth, curved surface obtained by combining n curved surfaces 35 to 37 composed of a first curved surface 35 having a radius r1, a second curved surface 36 having a radius r2 (where r1<r2), and an $m^{th}$ curved surface 37 having a radius rm (where rm−1<rm). The drill guide jig 20 shown in FIG. 7B can be used when rivet holes are formed using the drill 13 on the curved surfaces 35 to 37.

Figure 7B:
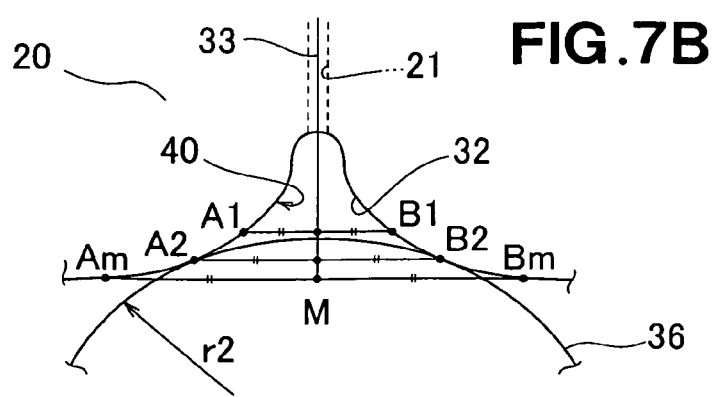

The V-shaped parts 32 of the drill guide jig 20 are provided with a left and right pair of contact points A2, B2 that are in contact with the curved surface 36 having the radius of r2, as shown in FIG. 7B. The center axis 33 orthogonal to the midpoint M of a line segment that connects the two contact points A2, B2 is made to match the center axis of the guide hole 21.

In a similar manner, a left and right pair of contact points A1, B1 corresponds to the short radius r1. The center axis 33 orthogonal to the midpoint M of a line segment that connects the two contact points A1, B1 is made to match the center axis of the guide hole 21.

Additionally, a left and right pair of contact points Am, Bm corresponds to the long radius rm. The center axis 33 orthogonal to the midpoint M of a line segment that connects the two contact points Am, Bm is made to match the center axis of the guide hole 21.

In this manner, a single drill guide jig 20 can be made to conform to numerous curved surfaces 35 to 37. The description above is based on the assumption that the shape of the V-shaped parts 32 is fixed.

The method for determining the shape of the V-shaped parts 32 is described next with reference to FIGS. 8A to 8J.

Figure 8A:
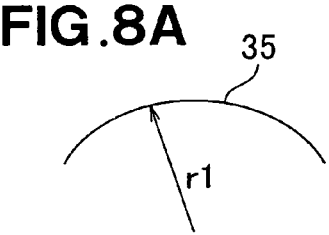
FIGS. 8A to 8J are schematic views illustrating a method for determining a V-shaped part.

The first curved surface 35 having a short radius r1 (strictly speaking, a curved line, but described as a curved surface for the sake of convenience; the same applies hereinbelow) is drawn in the manner shown in FIG. 8A. A tangent line 38 is drawn on the first curved surface 35, and a parallel line 39 is drawn at a distance h from the tangent line 38. The intersecting points of the parallel line 39 and the first curved surface 35 are designated as contact points A1, B1.

Figure 8B:
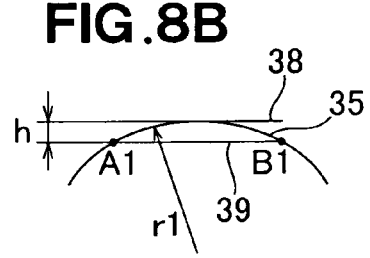
Figure 8C:
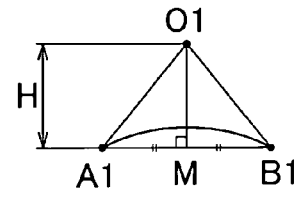

An origin O1 is set at an arbitrary distance H from the line segment that connects the contact points A1, B1, as shown in FIG. 8C. A line orthogonal to the midpoint M of the line segment that connects the contact points A1, B1 passes through the origin O1. In this manner, an isosceles triangle A1·B1·O1(A1, B1, O1 are the vertices of the triangle; the same applies hereinbelow) is established.

Figure 8D:
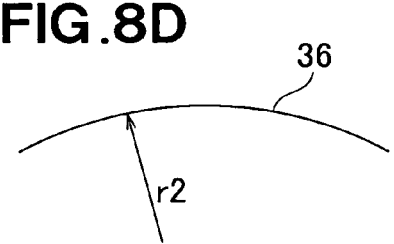
Figure 8E:
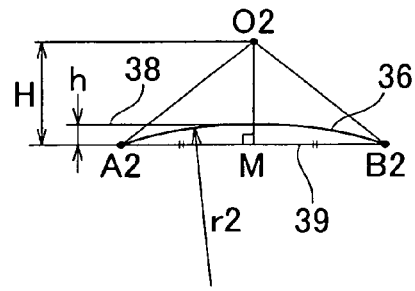

Next, a second curved surface 36 having a radius r2 is drawn, as shown in FIG. 8D. A tangent line 38 is drawn on the second curved surface 36, and a parallel line 39 is drawn at a distance h from the tangent line 38, as shown in FIG. 8E. The intersecting points of the parallel line 39 and the second curved surface 36 are designated as contact points A2, B2. An origin O2 is set at a distance H from the line segment that connects the contact points A2, B2. A line orthogonal to the midpoint M of the line segment that connects the contact points A2, B2 passes through the origin O2. In this manner, an isosceles triangle A2·B2·O2 is set.

Figure 8F:
Figure 8G:
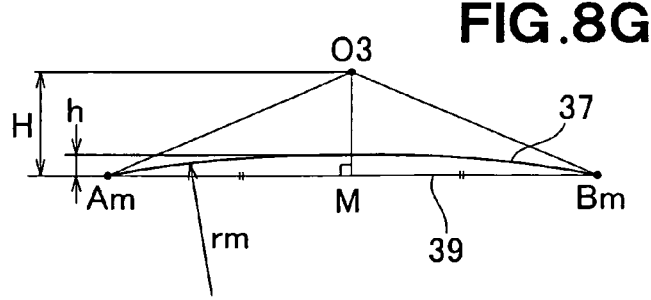

In a similar manner, an $m^{th}$ curved surface 37 having a long radius rm is drawn, as shown in FIG. 8F. A tangent line 38 is drawn on the $m^{th}$ curved surface 37, and a parallel line 39 is drawn at a distance h from the tangent line 38, as shown in FIG. 8G. The intersecting points of the parallel line 39 and the $m^{th}$ curved surface 37 are designated as contact points Am, Bm. An origin O3 is set at a distance H from the line segment that connects the contact points Am, Bm. A line orthogonal to the midpoint M of the line segment that connects the contact points Am, Bm passes through the origin O3. In this manner, a large and horizontally long isosceles triangle Am·Bm·O3 is set.

Figure 8H:
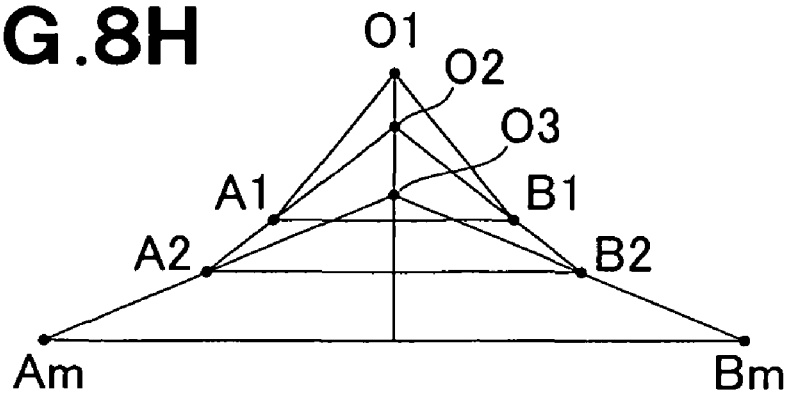

An isosceles triangle A1·B1·O1 is drawn as shown in FIG. 8H. The isosceles triangle A2·B2·O2 is superimposed so that the left and right oblique sides make contact at the contact points A1, B1 of the isosceles triangle A1·B1·O1. In a similar manner, the isosceles triangle Am·Bm·Om is superimposed so that the left and right oblique sides make contact at the contact points A2, B2 of the isosceles triangle A2·B2·O2.

Figure 8I:
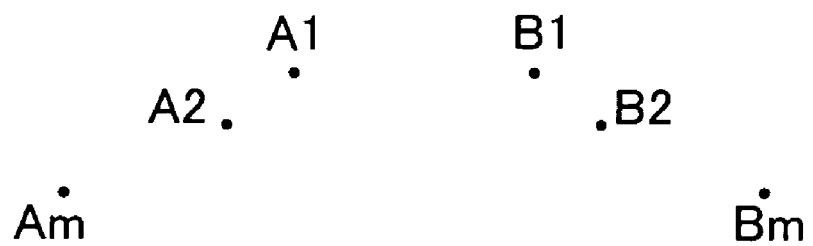
Figure 8J:
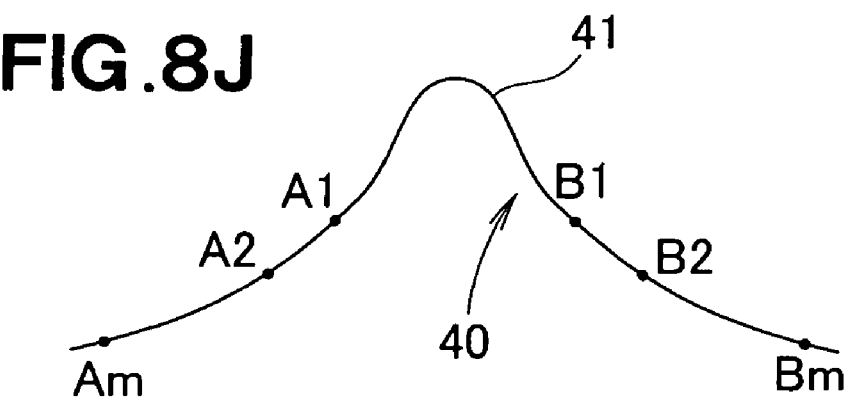

The contact points A1, B1, the contact points A2, B2, and the contact points Am, Bm drawn in FIG. 9H are subsequently extracted and redrawn, as shown in FIG. 8I. The contact points Am, A2, A1, B1, B2, Bm are then connected in sequence using an approximating curve 41, as shown in FIG. 8J. A curved surface 40 that conforms to the approximating curve 41 is the V-shaped part 32 shown in FIG. 7B.

In FIG. 8J, setting m as 3, 4, . . . , n yields an approximating curve 41 having two left and right contact points Am, Bm in contact with n curved surfaces up to rn. In other words, it is possible to conform to n number of curved surfaces.

Figure 9A:
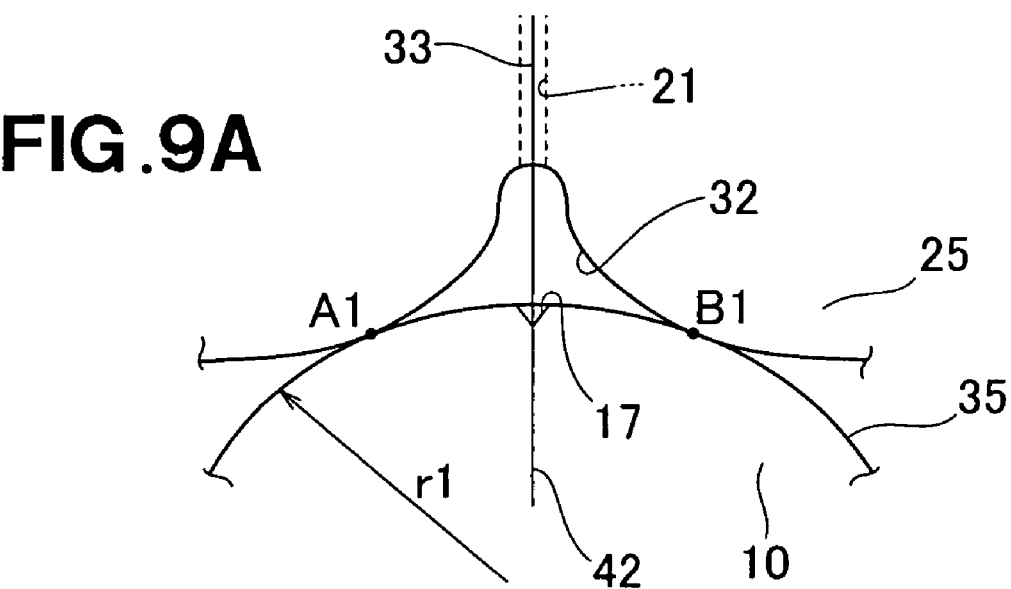
FIGS. 9A and 9B schematically illustrate a method for determining a V-shaped part, according to another embodiment of the present invention.
Figure 9B:
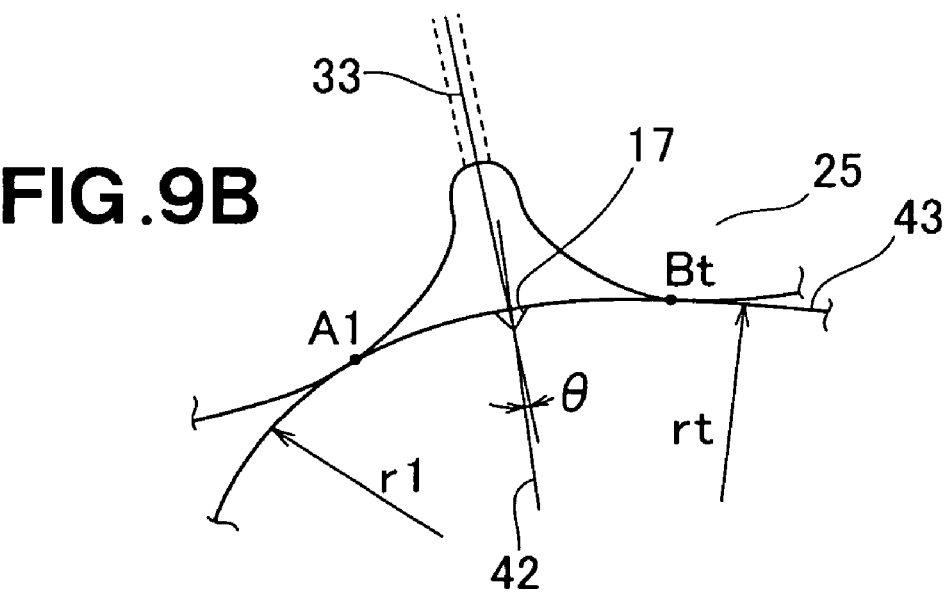

FIGS. 9A and 9B show another embodiment of the present invention.

As shown in FIG. 9A, a curved surface in which a punch mark 17 has been added is designated as a first curved surface 35, for example. Contact points A1, B1 are set symmetrically in the lateral direction when a contact part 25 makes contact with the first curved surface 35. Since there is a match between a center axis 33 and a normal 42 to the first curved surface 35, a hole can be accurately formed in the workpiece 10. The same effect is obtained if the radius r1 is replaced by a radius of another size.

The radius at the end of an airplane wing or the like sometimes varies in steps within a narrow range, as shown in FIG. 9B. The contact part 25 makes contact at two contact points, even if the contact part 25 is brought into contact with such a complex compound curved surface. An assumption is made that the contact points are a left contact point A1 and a right contact point Bt. The contact point Bt is a point that corresponds to a radius rt.

Figure 11A:
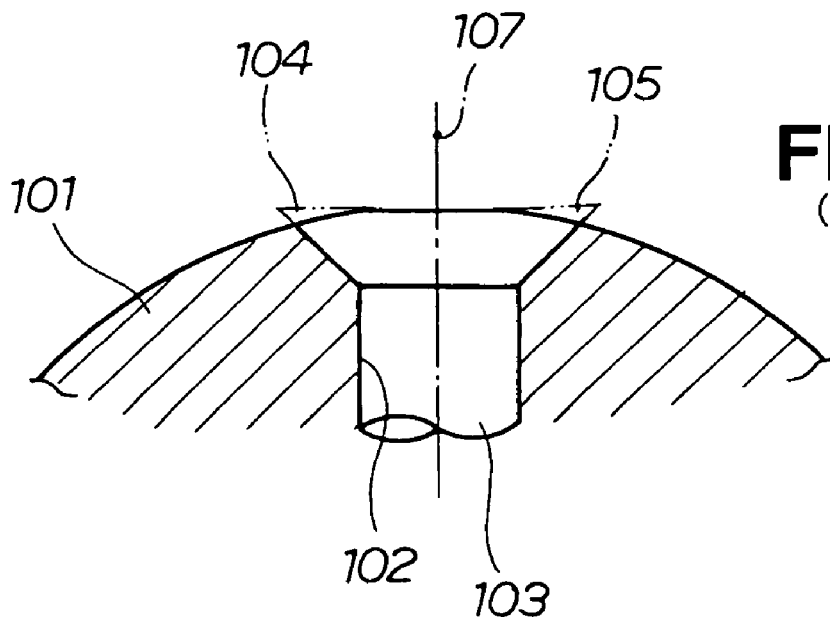
FIGS. 11A and 11B are views showing a relationship between a conventional curved panel and a rivet.
Figure 11B:
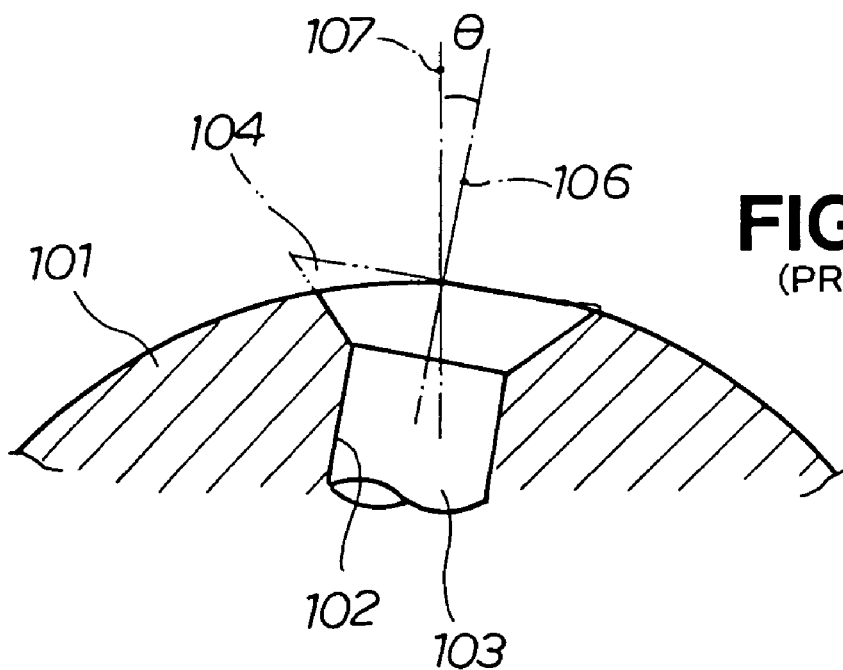
Figure 12A:
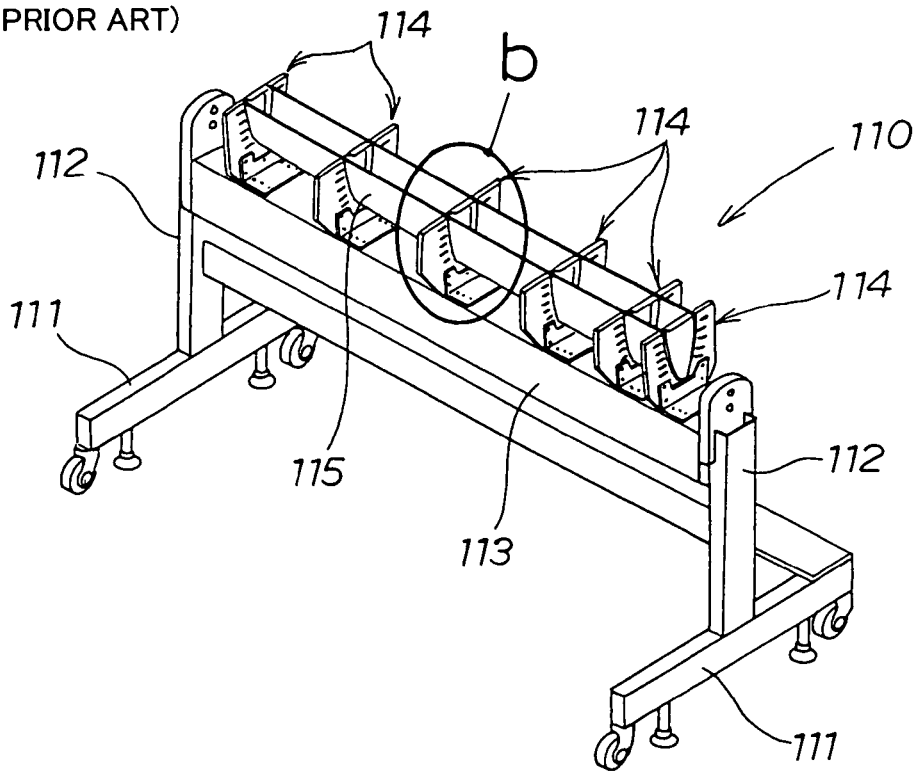
Figure 12B:
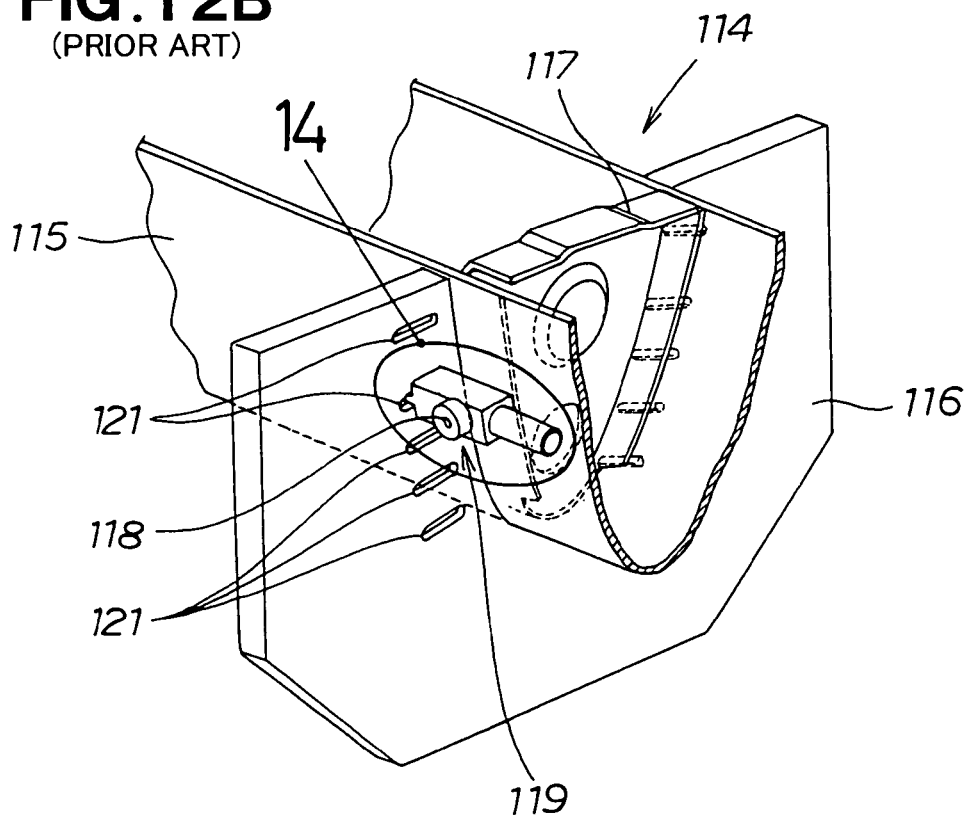

It is apparent in FIG. 9B that the center axis 33 deviates from the normal 42, and the intersecting angle θ increases as the difference between the radius r1 and the radius rt increases. Defects such as those described in FIG. 11B occur when the angle θ is too large.

The solution thereto is described with reference to FIGS. 10A to 10F.

Figure 10A:
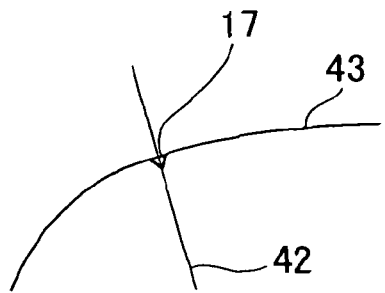
FIGS. 10A to 10F are schematic views illustrating correspondence in relation to the complex compound curve.

The punch mark 17 is set on a compound curve 43, and a normal 42 is set based on the radius of curvature in the punch mark 17, as shown in FIG. 10A.

Figure 10B:
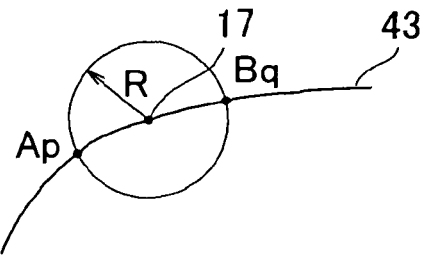

A circle having an arbitrary radius R is drawn, and the intersecting points Ap, Bq with the compound curve 43 are established, as shown in FIG. 10B. The punch mark 17 and intersecting points Ap, Bq can all be given as x, y coordinates if the compound curve is represented as two-dimensional information.

Figure 10C:
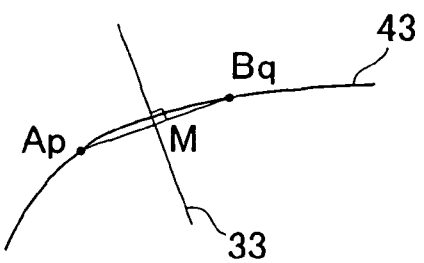

Next, the two intersecting points Ap, Bq are connected by a line segment, and a center axis 33 orthogonal to a midpoint M of the line segment is established, as shown in FIG. 10C.

Figure 10D:
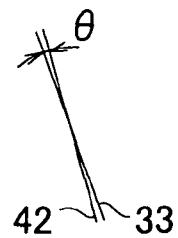

The angle θ formed by the center axis 33 and the normal 42 can be obtained geometrically or by numeric calculation, as shown in FIG. 10D. The angle θ is set in advance within a range of ±1° for a certain type of airplane fuselage.

An assumption is made that the angle θ obtained geometrically or by numeric calculation is ±1.5°. In this case, the following correction is performed. In FIG. 10B, it can be understood that the difference between the radius of curvature at the intersecting point Ap and the radius of curvature at the intersecting point Bq increases as the radius R increases, and the difference decreases as the radius R is reduced. The angle θ shown in FIG. 10D is reduced when the difference is reduced.

In view of the above, the radius R is reduced in FIG. 10B. FIGS. 10B to 10D are recalculated based on the short radius R. Calculation is completed when the calculated angle θ converges to within ±1°, the fixed intersecting point Ap is substituted with the intersecting point A1, and the intersecting point Bq is substituted with the intersecting point B1.

Figure 10E:
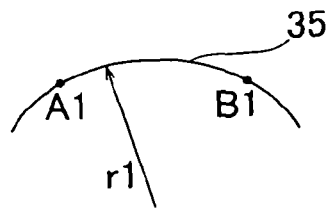
Figure 10F:
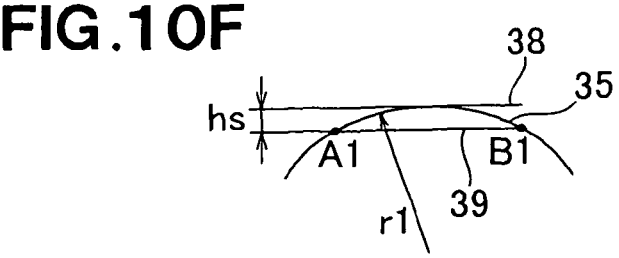

Next, a first curved surface having a radius r1 is drawn so as to pass through the substituted contact point A1 and contact point B1, as shown in FIG. 10E. A tangent line 38 is then drawn on the first curved surface 35, as shown in FIG. 10F. Lastly, the distance hs from a parallel line 39 to the tangent line 38 is determined.

The distance hs defined by the above procedure is used as the distance h shown in FIGS. 8B, 8E, and 8G. The adjusted approximating curve 41 can be made to conform to the complex compound curve 43 shown in FIG. 9B when the approximating curve 41 of FIG. 8J is adjusted based on the distance hs. In other words, the angle θ in FIG. 9B should not exceed the preset reference range (a range of ±1°, for example).

Next, in FIG. 9B, a case in which the radii r1, rt are both short, and a case in which the two are both long is compared at a constant distance between the contact point A1 and the contact point Bt.

Let r1 be 30 mm and rt be 40 mm when both [of the radii] are short. The percentage of variation in the radii can be calculated by (rt−r1)/r1, i.e., (40−30)/30=0.33=33%.

Let r1 be 300 mm and rt be 320 mm when both [of the radii] are long. The percentage of variation in the radii is (320−300)/300=0.067=6.7%.

Since the angle θ increases as the percentage of variation of the radii is increased, the angle θ will inevitably be confined to a preset reference range (a range of ±1°, for example) at the other radii r2 to rn (or rm) when the angle θ is determined using the shortest radius r1.

Due to the reason above, it is apparent that an analysis based on FIGS. 10A to 10F may be performed for the right contact point B1 and the left contact point A1 having the shortest distance from the center axis 33. These points are two of the contact points shown in FIG. 7B.

In view of the above, a technique described in FIGS. 10A to 10F may be structured in the following manner.

In FIGS. 10A to 10F, a compound curve 43 is composed of a plurality of contiguous curved surfaces having radii that increase in steps, a left contact point Ap having the shortest distance from the center axis 33 is designated as the first left contact point Ap (corresponding to A1), and a right contact point Bq which corresponds to the point Ap is designated as the first right contact point Bq (corresponding to B1). When the center axis 33 orthogonal to the midpoint M of a line segment connecting the first left contact point Ap and the first right contact point Bq becomes offset from the normal 42 in the punch mark 17 due to the difference in radii between a curved surface with which the first left contact point Ap makes contacts and a curved surface with which the first right contact point Bq makes contacts, the length of the line segment which connects the first left contact point Ap and the first right contact point Bq is limited so that the angle θ formed by the normal 42 and the center axis 33 converges to within a preset range (a range of ±1°).

The drill guide jig of the present invention can be used when a hole is formed in a workpiece having a curved surface by using a hand drill apparatus, and the type of workpiece or the type of hole that is formed is arbitrary.

The drill guide jig of the present invention can be used to form rivet holes in an airplane fuselage.

Obviously, various minor changes and modifications of the present invention are possible in light of the above teaching.

It is therefore to be understood that within the scope of the appended claims the invention may be practiced otherwise than as specifically described.

What is claimed is:

1. A drill guide jig for guiding a drill orthogonally to a single curved surface of a workpiece or to a workpiece having a compound curved surface composed of a plurality of radii, when a hole is formed in said surface using a hand drill apparatus, which comprises:
    a guide member having a guide hole for guiding the drill; and
    a holding member for holding the guide member, the holding member being designed to allow grasp by a worker and having contact parts for contacting the curved surface,
    wherein when the workpiece has a single curved surface the contact parts include left and right contact points for contacting the curved surface, and the guide hole is disposed along a center axis orthogonal to a midpoint of a line segment that connects the two contact points, and when the workpiece has a compound curved surface composed of said plurality of radii, the contact parts comprise a plurality of right contact points and a plurality of left contact points that correspond to the radii of curvature and the guide hole is disposed along a center axis orthogonal to a midpoint of a line segment that connects the plurality of right contact points and the plurality of left contact points that correspond to the plurality of radii of curvature.

2. The drill guide jig of claim 1, wherein the contact parts have a notched groove in a portion thereof.

3. The drill guide jig of claim 1, wherein the contact parts define a curved surface established by sequentially connecting a plurality of contact points.

4. The drill guide jig of claim 1, wherein the compound curved surface comprises: a plurality of contiguous curved surfaces having radii that increase in steps; a left contact point having the shortest distance from the center axis is designated as a first left contact point; and a right contact point which corresponds to the first left contact point is designated as a first right contact point, and wherein the length of a line segment connecting the first left contact point and the first right contact point is limited so that, when a center axis orthogonal to the midpoint of the line segment connecting the first left contact point and the first right contact point is offset from a desired normal due to the difference in radii between a curved surface in contact with the first left contact point and a curved surface in contact with the first right contact point, the angle formed by the normal and the center axis converges to within a preset range.

5. The drill guide jig of claim 4, wherein the contact parts define a curved surface established by sequentially connecting a plurality of contact points.

6. The drill guide jig of claim 5, wherein the curved surface presents a V-shape that includes at least the first left contact point and at least the first right contact point.

7. The drill guide jig of claim 1, wherein the contact parts are provided with an elastically deformable anti-slip member having a high coefficient of friction.

8. The drill guide jig of claim 7, wherein the anti-slip member is accommodated in a placement groove so that a portion of the anti-slip member protrudes from the placement groove formed on a periphery of the contact parts.

* * * * *